April 3, 1956 P. S. CLAPPER 2,740,230
CROP DUSTERS
Filed April 29, 1953 2 Sheets-Sheet 1

INVENTOR
PRESTON S. CLAPPER

April 3, 1956 P. S. CLAPPER 2,740,230
CROP DUSTERS
Filed April 29, 1953 2 Sheets-Sheet 2
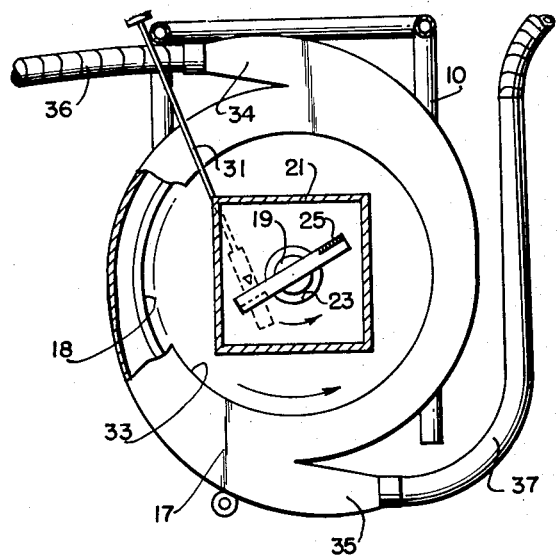
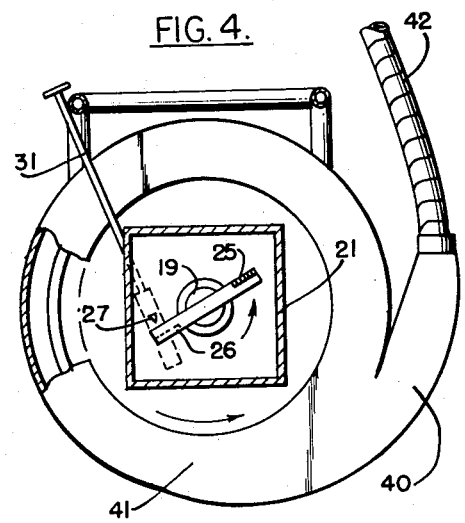
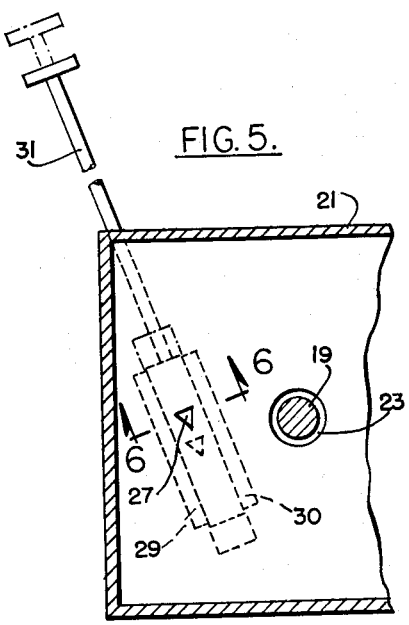
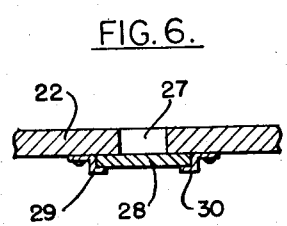
INVENTOR
PRESTON S. CLAPPER United States Patent Office 2,740,230
Patented Apr. 3, 1956

2,740,230
CROP DUSTERS

Preston S. Clapper, Vista, Calif., assignor to Powerpak Equipment Company, Vista, Calif., a corporation of California Application April 29, 1953, Serial No. 352,001

1 Claim. (Cl. 43—148)

This invention relates to a crop duster.

It is an object of the present invention to provide a crop duster which can be carried on the back of one man and wherein the operating parts thereof are driven by a gasoline engine forming a part of the duster and whereby to eliminate the need for hand operation.

It is another object of the present invention to provide a gasoline engine-operated one-man duster for crops wherein the engine is directly connected to the fan and agitator, both the fan and the agitator lying directly over the engine and driven by the drive shaft thereof and whereby to eliminate the use of belts, clutches, gears, chains and similar driving mechanisms.

It is another object of the invention to provide an efficient duster which can be operated by one man and have the normal capacity of several men with conventional one-man dusters, and wherein the operator can walk with a normal walking gait while effecting the dusting operation.

Other objects of the invention are to provide a crop duster having the above objects in mind, which is of simple construction, inexpensive to manufacture, has a minimum number of parts, light in weight, compact, durable, and efficient in operation.

For a better understanding of the invention, reference may be had to the following detailed description taken in connection with the accompanying drawing, in which:

Fig. 3 is a transverse sectional view taken on line 3—3 of Fig. 2;

Fig. 4 is a similar sectional view to the sectional view shown in Fig. 3 modified for operation with but one dusting tube;

Fig. 5 is an enlarged fragmentary sectional view taken on line 5—5 of Fig. 2 and showing the adjustment of the gate valve for controlling the flow of dust to the fan;

Fig. 6 is a transverse sectional view of the gate valve means.

Figure 1:
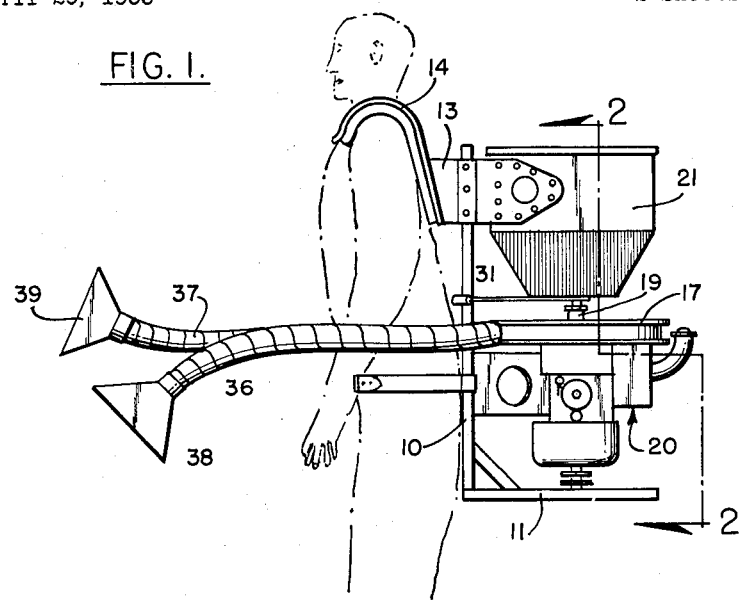
Figure 1 is a side elevational view of the crop duster attached to one man.
Figure 2:
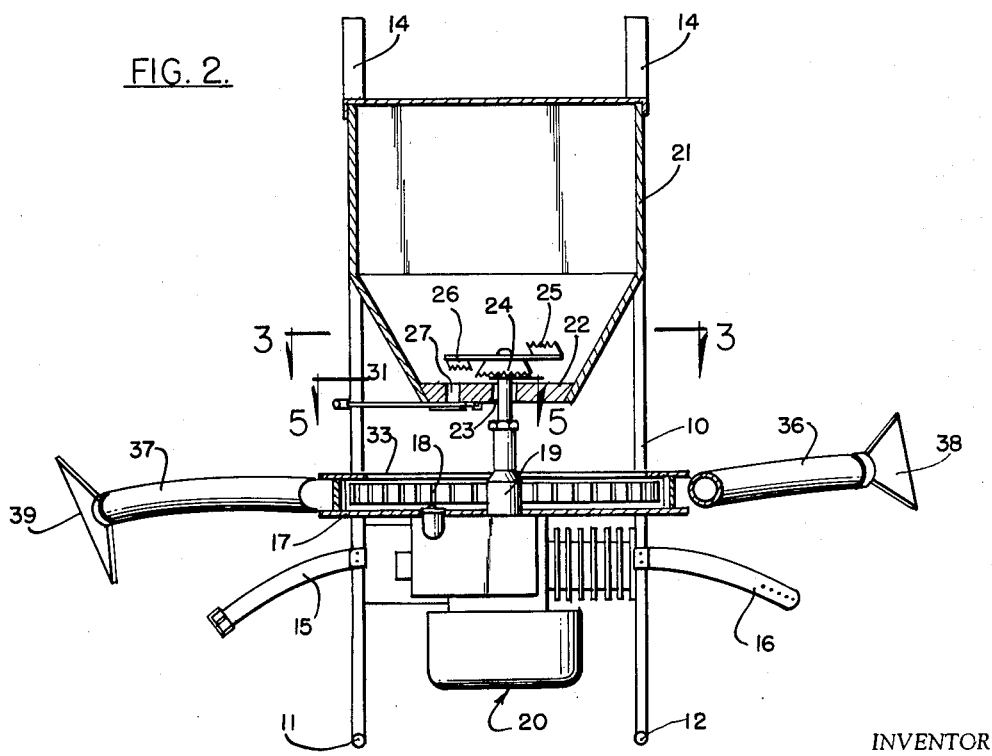
Fig. 2 is a vertical sectional view taken on line 2—2 of Fig. 1.

Referring now to the figures, 10 represents a vertical frame to the lower end of which there is attached a horizontal support and guard portions 11 and 12.

To the upper end of the vertically extending frame 10 there is connected bracket members 13 having shoulder supporting projections 14 adapted to extend over the shoulders of the operator. Below the shoulder supporting members 14 are straps 15 and 16 connected to the opposite sides of the frame 10 and adapted to extend around the waist of the operator whereby to securely fix the duster to the operator at both the shoulder and the waist.

The fan casing 17 is connected to the vertically extending frame 10 and this casing houses the dusting fan 18 which is driven by the drive shaft 19 of the gas engine 20.

The bracket members 13 extend rearwardly and support the hopper 21 in the lower end of which is a plate 22 having a hole 23 through which the drive shaft 19 extends. Within the hopper and secured to the drive shaft are agitating members 24, 25 and 26.

A side hole 27 is provided in the plate 22 and a slide gate 28 is slidable beneath the same between guide rails 29 and 30, Fig. 6. This gate has a handle projection 31 which extends outwardly to a point where it is easily accessible to the operator's hand and when pulled to the open position, dust is passed through the opening 27 and out to the fan 18. The top of the casing 17 has an opening 33 through which the dust can pass to the fan blower 18. Extending outwardly from diametrically opposite sides of the casing are spouts 34 and 35 to which there are respectively connected flexible tubes 36 and 37 having nozzles 38 and 39 thereon by which the dust can be directed toward the plant rows. The operator can in that manner feed two different plant rows at the same time.

In the form of the invention shown in Fig. 4, there is but a single spout 40 connected then to the casing 41 and having a flexible tube 42 connected therewith. For certain crops the single spout arrangement will be satisfactory.

It should now be apparent that there has been provided a power operated duster which is run by a gasoline engine and wherein the same drive shaft 19 serve to drive the dusting fan and well the agitator disposed in a hopper that is elevated above the fan and wherein the bottom of the hopper has an opening therein controlled by a gate so that the dust passing though the opening will be dropped on to the fan 18.

While various changes may be made in the detail construction, it shall be understood that such changes shall be within the spirit and scope of the present invention, as defined by the appended claim.

What is claimed is:

A portable crop duster comprising a frame, a gasoline engine connected to said frame adjacent the bottom of said frame, a drive shaft extending vertically from said engine, a hopper connected to said frame adjacent the top thereof, a blower casing connected to the frame intermediate the gas engine and the hopper, said casing having outward tube means extending therefrom, said drive shaft extending into the bottom of the hopper and having agitating elements thereon adjacent the bottom of said hopper, a gate valve connected to the underneath surface of the bottom of the hopper having an opening therein for opening or closing said opening, said fan blower casing being open at the top and having a fan therein, said dust from the opening in the bottom of the hopper being dropped by gravity on to the fan through the opening of the casing, brackets connected to the top of the frame, shoulder supporting hangers connected to said brackets and adapted to extend over the shoulders of an operator, the hopper being connected to the opposite ends of the brackets, strap means connected to the vertically extending frame and adapted to be extended about the waist of the operator, said hopper, said blower casing and said drive shaft being aligned upon a common axis normally vertically disposed during operation.

References Cited in the file of this patent

UNITED STATES PATENTS

| | | |
|---|---|---|
| 400,757 | Dixey | Apr. 2, 1889 |
| 423,814 | Richards | Mar. 18, 1890 |
| 1,674,391 | Dunnagan | June 19, 1928 |
| 2,104,486 | Johansen | Jan. 4, 1938 |
| 2,429,773 | Root | Oct. 28, 1947 |
| 2,619,767 | Woock | Dec. 2, 1952 |